Patented Apr. 19, 1949

2,467,993

UNITED STATES PATENT OFFICE 2,467,993

MANUFACTURE OF FORMALDEHYDE AND APPARATUS THEREFOR

Raymond P. Rossman, North Scituate, Mass., assignor to Godfrey L. Cabot, Inc., Boston, Mass., a corporation of Massachusetts Application November 10, 1943, Serial No. 509,733

4 Claims. (Cl. 260—604)

This invention consists in improvements in processes of producing formaldehyde from natural gas. It has been known for many years that methane may be converted into formaldehyde by mixing natural gas with nitrogen oxides as a gaseous catalyzer and heating, thus inducing an oxidizing reaction in the mixture resulting in the formation of formaldehyde. Processes of this character as heretofore carried out have not been entirely satisfactory for large scale production and have been carried out only with poor efficiency in respect both to time and materials used. The present invention consists in improvements by which the output of formaldehyde may be greatly increased as compared to the output of previous processes, the efficiency of the manufacturing process greatly increased in respect to the use of gas and catalyzers, and the time for completing the process very greatly reduced as compared to the time formerly required. Moreover, the process of my invention may be advantageously carried out in apparatus of compact design and in a continuous manner of operation.

Heretofore it has been considered necessary to employ an air-gas mixture containing a large excess of air, for example, to five parts of air one part of methane. In accordance with my novel process however, I require a much smaller proportion of air, and may employ about equal parts air and methane or 30 to 50 parts methane with 70 to 50 parts air. From this striking difference in procedure flow several extremely important advantages. In the first place, the less air used the higher the yield of formaldehyde per volume treated and per volume of methane. This advantage results partly from the fact that when a larger proportion of air is used in the process a very appreciable amount of methane is necessarily burned up and wasted. In the second place, the smaller volume of air used results in less dilution of the product than heretofore, so that recovery is more complete and cheaper. In the third place, the reaction rate is faster and the process therefore is more efficient in respect to time than heretofore. Finally, since the dilution of the gas is less, the process results in a more combustible waste gas mixture and this may be utilized as an efficient fuel for heating the reactors.

Heretofore a maximum temperature of about 1000° F. has been employed for inducing the desired oxidizing reaction, whereas I find that improved results are attained by employing decidedly higher temperature, for example at least 1200° F.

As a result of the rich air-gas mixture employed and the increased working temperature, I find that the process may be very appreciably speeded up. For example, in processes heretofore practiced a contact time of about 8 seconds for reacting the methane has been considered necessary, whereas the contact time of our novel process is in the order of ¼ to ½ second.

Another extremely important advantage of my improved process is that the amount of catalyzer employed may be very substantially reduced. For example, heretofore it has been considered necessary to employ $NO_2$ in amounts between 4.5 and 9 lbs. per 1000 cu. ft. of methane which weighs 44.4 lbs. at 0° C. and 32° F. I have discovered that in practicing my process I require only about .29 lb. of $NO_2$ per 1000 cu. ft. of methane. I am thus able to reduce by more than one half the amount of the most expansive item required in carrying out my process.

In addition to these specific novel and characteristic features which contribute to the valuable and unexpected results of my novel process, certain novel features have been embodied in the apparatus for carrying my process into effect. For example, I find that it is advantageous to employ a silica tube as a heat reactor element. I have found that the reaction is highly exothermic above a critical temperature and that local overheating of the gas mixture therefore may in some cases tend to cause the reaction to run away. This is obviated by avoiding non-uniform heating of the tubes due to radiation by conductivity of the tube walls. To this end I employ a number of tubes in parallel with two passes each, and make the first pass of low alloy steel tube and the second pass of a silica tube. I am thus able to employ a material of low heat conductivity for the hottest part of the reactor and to restrict the more fragile silica tubes to that portion of the apparatus only which is subject to the higher operating temperature. I also secure additional benefit from the retarding effect of the $SiO_2$ on the oxidation of formaldehyde in the presence of air and nitrogen. Local overheating is further avoided by maintaining the air-gas mixture in a state of highly turbulent flow within the reactor.

The process of my invention will be best understood and appreciated by first considering the accompanying diagrammatic flow sheet of apparatus which may be advantageously employed in carrying out my novel process, although it will be understood that the process is not restricted to this or to any specific type of apparatus.

In the accompanying drawings.

Figure 1:
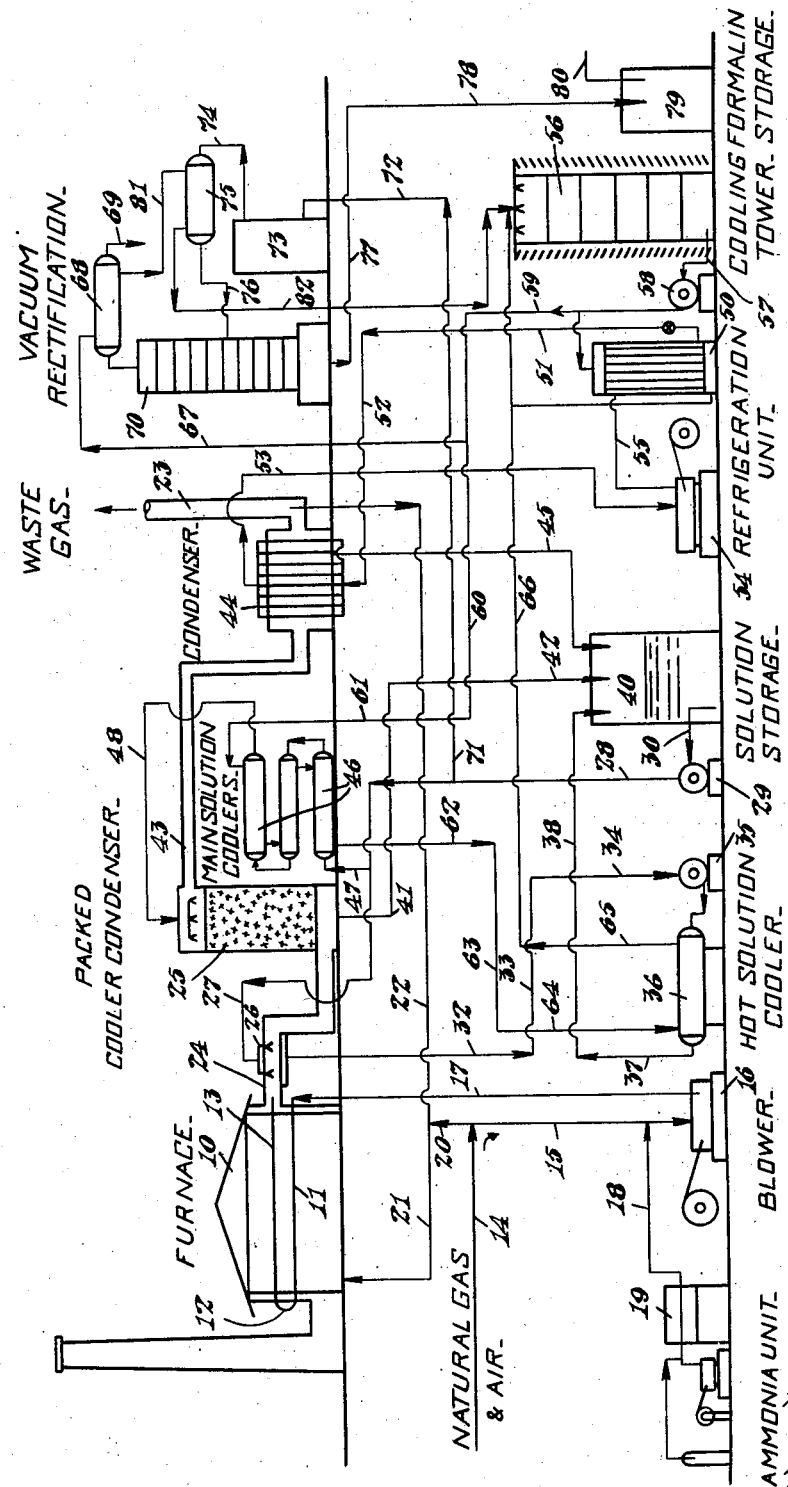
Fig. 1 is a diagrammatic flow sheet.

The flow sheet of Fig. 1 illustrates one suitable form of apparatus arranged compactly for carrying out the process of my invention in a continuous manner. A furnace 10 is shown on the left hand side of the assembly and this contains a series of horizontal two-pass reactors, only one appearing in Fig. 1. Each reactor may comprise a lower tube 11 of allow steel connected outside the furnace wall by a metal U-bend 12 to an upper horizontal tube 13 of silica. Methane and air mixed in the proper proportions are delivered to the apparatus through a horizontal supply pipe 14, the mixture being led downwardly through a vertical pipe 15 to a blower 16 and forced by the blower through a vertical pipe 17 to the right hand end of the tube 11. Oxides of nitrogen are introduced into the vertical pipe 15 from a catalytic ammonia combustion unit 19 through a horizontal pipe 18. The vapor of nitrogen oxides is thus drawn into the blower, forced by it into the air-gas mixture and then in a turbulent current through the tubes of the reactor.

In the apparatus herein shown the furnace is heated by natural gas fuel and the supply pipe 14 is shown as connected to a fuel inlet pipe 21 through a connection 20. To this gaseous fuel may be added waste gas, uncondensed in its progress through the apparatus, taken from the waste gas stack 23 through the horizontal pipe 22 which leads directly to the fuel inlet pipe 21. The furnace is regulated preferably so that the steel tube of the reactor is heated to approximately 900° F. and the silica tube 13 to about 1200° F. These conditions have been found particularly favorable since contact of the mixture with $SiO_2$ of the silica tube tends to retard oxidation of the formaldehyde which is formed in the reaction.

The gaseous products of the reaction are delivered from the silica tubes 13 of the reactors through a manifold, not shown, into an outlet duct 24 in which they are immediately cooled by a spray of cool formaldehyde solution of approximately 19.2% concentration supplied by a spray head 26. The spray head is connected through a pipe 27 and a vertical pipe 28 to a pump 29, which draws the cool formaldehyde solution from a storage tank 40, the pump having an inlet connection 30 with the tank 40. The spray head 26 has return connection 32, 33, 34 to a second pump 35 by which the formaldehyde solution, heated by contact with the vaporized product in its spraying operation, is delivered to a hot solution cooler 36 and then forced from the cooler through a vertical pipe 37 and the horizontal pipe 38 to the storage tank 40.

The outlet duct 24 leads from the reactor manifold to the bottom of a packed cooler condenser tower 25. That portion of the vaporized product not condensed by the formaldehyde spray from the spray head 26 now passes upwardly through the condenser 25. Formaldehyde solution condensed in its progress through the condenser 25 is drawn off through pipe connections 41—42 and delivered to the storage tank 40. That part of the vaporized product not condensed in the condenser 25 passes into an outlet duct 43 which leads from the top of the condenser and is carried through a refrigerated condenser 44. Formaldehyde solution condensed from this vapor passes down through the vertical pipe 45 and back to the storage tank 40, while gases still uncondensed are discharged through the waste gas stack 23 or are drawn from this stack through the connection 22 for fuel.

A portion of the formaldehyde solution pumped upwardly through the pipe 28 on its way to the spray head 26 is deflected by a connection 47 and conducted through a series of tubular coolers 46 passing from these through the outlet pipe 48 which leads back to the top of the condenser tower 25. The cooled formaldehyde solution passes downwardly through the condenser 25 in counter-flow relation to the ascending vaporized product.

An ammonia refrigeration unit 50 is provided for the purpose of supplying a refrigerating medium to the condenser 44. Liquified ammonia gas passes upwardly from the vertical pipe 51 and the horizontal pipe 52 to the condenser 44, and expanding into the condenser, is returned through the vertical pipe 53 to the compressor 54. It is drawn from the compressor 54 through the horizontal pipe 55, to the unit 50.

Cooling water for the refrigeration unit is drawn from a cooling tower 56 through an outlet pipe 57 and forced by a circulating pump 58 upwardly through the vertical pipe 59, horizontal pipe 60 and the vertical pipe 61, to the main solution coolers 46. It is discharged from these coolers through the pipes 62, 63, 64, and delivered to the hot solution cooler 36. It leaves the hot solution cooler through the vertical pipe 65 and is returned through the horizontal pipe 66 through the top of the cooling tower. Cooling water is also taken from the horizontal pipe 60 through the vertical pipe 67 to a condenser 68 connected to the top of a rectifying column 70, while the spent cooling water is discharged from the cooler 68 by the connection 82.

Formaldehyde which has been collected from the quenching station at the furnace and the two condensers 25 and 44 in the storage tank 40 at a concentration of about 19.2% by weight is now to be concentrated to the 38% formalin solution required in commerce. The solution withdrawn from the storage tank 40 contains up to 1.5% formic acid and a small amount of acetaldehyde. The former should be removed or neutralized before concentration in order to reduce corrosion in the concentration equipment and to produce an acceptable formalin product. Accordingly the 19.2% solution withdrawn from the storage tank 40 and pumped through the vertical pipe 28 is drawn from this pipe by a horizontal pipe 71 and conducted through the vertical pipe 72 to a boiler 73 where the formaldehyde solution may be boiled with caustic, for example, 100 to 200 lbs. of caustic to 2000 gals. of formalin solution, and then passed through a connecting pipe 74 to a preheater 75. From the preheater it is delivered by a pipe 76 to approximately the center of the rectification column 70. The formalin solution is collected from the bottom of the column and delivered by connecting pipes 77 and 78 to a formalin storage tank 79. From there it may be pumped through a delivery pipe 80 as required.

Instead of wasting the spent water from the condenser 68 by the connection 81 this water may be passed through the connection 81 to the condenser 75 and returned from there through the vertical pipe 82 to the pipe 63 and the water cooling tower 56.

Figure 2:
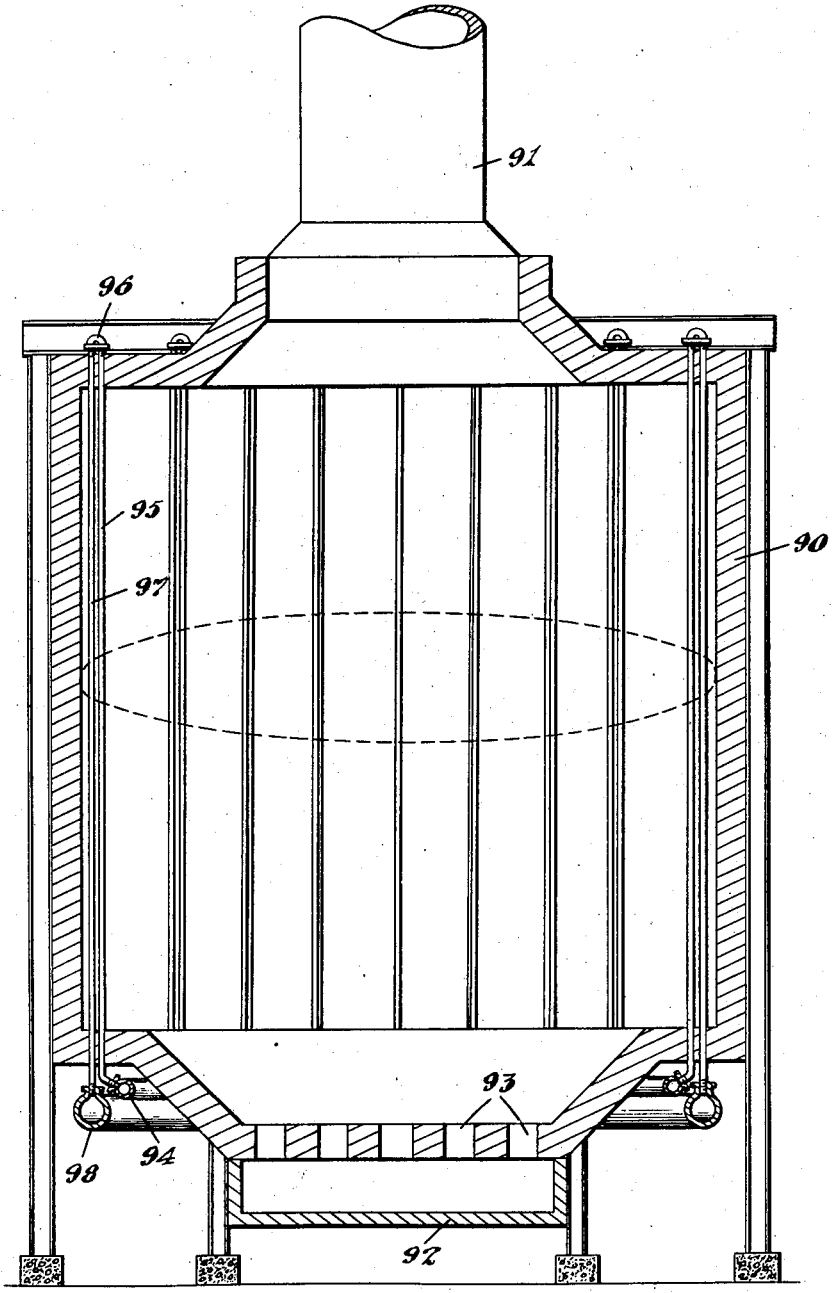
Fig. 2 is a view in vertical section of a furnace in which the reactor tubes are arranged in vertical position.

A furnace of the vertical type suitable for carrying out the process of my invention is shown in Fig. 2. This comprises a cylindrical refractory body 99 having an unobstructed central combustion space and at its upper end an outlet stack 91 for the products of combustion. Gaseous fuel is conducted to the bottom of the furnace through a duct 92 and delivered to its interior through burner openings 93. The entire interior of the furnace is ringed with a double bank of vertical tubes. The tubes 95 of the inner bank are of alloy steel and each is connected in series outside the top of the furnace by a metal U-bend to a tube 97 of the outer bank. These are preferably of silica as already explained in connection with the furnace of Fig. 1. The air-gas-NO₂ mixture is supplied to the steel tubes 95 through an annular gas inlet manifold 94 which is located outside and below the body of the furnace. The gases delivered from the manifold 94 pass upwardly through the steel tubes 95 where they may be heated to a temperature approaching 900° F. for example, and then passed downwardly to the silica tubes 97 where they are heated to a temperature of approximately 1200° F. Reacted vaporized product is delivered to an annular outlet manifold 98 and immediately subjected to a quenching operation by a spray of cool formaldehyde solution of about 19.2% concentration as outlined in the explanation of the flow sheet of Fig. 1 or the quenching step may be carried out directly in the manifold 98. In Fig. 1 the spray head 26 for cool formaldehyde solution is shown as located in the outlet duct from the reactor manifold.

It will be noted that the apparatus above described is designed to be operated at atmospheric pressure. This is a characteristic and very important feature of the process of my invention and one that distinguishes it from processes heretofore attempted which have invariably required high operating pressure and the presence of solid catalysts.

The broad process herein disclosed is the invention of Thomas K. Sherwood and is claimed in U. S. Patent No. 2,412,014, granted December 3, 1946, on his application.

Having thus disclosed my invention and described an illustrative example thereof, I claim as new and desire to secure by Letters Patent:

1. The process of making formaldehyde from methane which includes the steps of mixing methane, air and nitrogen oxides, passing the mixture through a continuous tubular reactor at substantially atmospheric pressure, first in contact with metal at a temperature below 1100° F. and then immediately in contact with silica at a temperature above 1100° F., and condensing the gaseous product after it leaves the reactor.

2. The process of making formaldehyde from methane which includes the steps of mixing methane and air in substantially equal proportions, adding nitrogen oxides, and then passing the mixture at substantially atmospheric pressure through a metallic reactor at a temperature of not over 1000° F. and then immediately through a connected silica reactor at a temperature of about 1200° F.

3. Apparatus for the manufacture of formaldehyde from natural gas, including in its structure a vertically disposed furnace having cylindrical walls forming a combustion space, a double bank of vertical tubes aranged in pairs and ringing the interior wall of the furnace, the tubes of one series being of alloy steel and the tubes of the other series being of silica, each pair of tubes being connected together at one end outside the combustion space of the furnace, inlet and outlet manifolds located outside the combustion space and connected respectively to the other ends of the tubes, whereby a gaseous mixture may be delivered simultaneously to all the alloy steel tubes and withdrawn from the silica tubes after reaction has taken place, the silica tubes serving to retard the oxidation of formaldehyde which has been formed in the reaction.

4. Apparatus for manufacture of formaldehyde from hydrocarbon gas, including in its structure a furnace having walls forming a combustion space, a pair of substantially parallel tubes disposed in said combustion space, one of said tubes being of alloy steel and the other being of silica, the tubes being connected together at one end outside the combustion space of the furnace, and inlet and outlet connections connected respectively to the other ends of the tubes, whereby a gaseous mixture may be delivered to the alloy steel tube and withdrawn at the same end of the furnace from the silica tube after reaction has taken place, the silica tube serving to retard the oxidation of formaldehyde which has been formed in the reaction.

RAYMOND P. ROSSMAN.

REFERENCES CITED

The following references are of record in the file of this patent:

UNITED STATES PATENTS

| Number | Name | Date |
|---|---|---|
| Re. 15,789 | Bibf | Mar. 11, 1924 |
| 1,184,576 | Scherbel | May 23, 1916 |
| 1,321,892 | Crowell | Nov. 18, 1919 |
| 1,692,688 | Smith | Nov. 29, 1928 |
| 1,880,309 | Wulff | Oct. 4, 1932 |
| 1,928,140 | Smith | Sept. 26, 1933 |
| 1,975,663 | Reid | Oct. 2, 1934 |
| 2,007,116 | Walker | July 2, 1935 |
| 2,102,160 | Nashan | Dec. 14, 1937 |
| 2,153,526 | Walker | Apr. 4, 1939 |
| 2,190,453 | King et al. | Feb. 13, 1940 |
| 2,196,767 | Hasche | Apr. 9, 1940 |
| 2,236,555 | Wulff | Apr. 1, 1941 |
| 2,244,210 | Nashan et al. | June 3, 1941 |

FOREIGN PATENTS

| Number | Country | Date |
|---|---|---|
| 375,314 | Great Britain | June 20, 1932 |
| 405,763 | Great Britain | Feb. 15, 1934 |
| 350,922 | Germany | |

OTHER REFERENCES

Bloomer et al., "Can. J. Research," 15B (1937), pp. 375–382.